United States Patent
Ibuki

(12) 
(10) Patent No.: US 6,283,263 B1
(45) Date of Patent: Sep. 4, 2001

(54) CLUTCH AND BRAKE CONTROL SYSTEM FOR TRACKLAYING CONSTRUCTION VEHICLE

(75) Inventor: Toshio Ibuki, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/443,435

(22) Filed: Nov. 19, 1999

(30) Foreign Application Priority Data

Dec. 8, 1998 (JP) ................................................ 10-348778

(51) Int. Cl.$^7$ ..................................................... B62D 11/08
(52) U.S. Cl. ........................ 192/13 R; 192/12 C; 180/6.7
(58) Field of Search ................................ 192/13 R, 12 C; 180/6.2, 6.7

(56) References Cited

U.S. PATENT DOCUMENTS

| 4,137,944 | * | 2/1979 | Koch ............................... 192/13 R X |
| 5,375,686 | * | 12/1994 | Yamamoto ......................... 192/13 R |
| 5,503,232 | * | 4/1996 | Matsushita et al. .............. 180/6.2 X |
| 5,868,230 | * | 2/1999 | Chatterjea et al. ................ 192/13 R |

FOREIGN PATENT DOCUMENTS 58-47377   10/1983   (JP) .
4-43162    2/1992    (JP) .

* cited by examiner

*Primary Examiner*—Richard M. Lorence
(74) *Attorney, Agent, or Firm*—Armstrong, Westerman, Hattori, McLeland & Naughton, LLP

(57) ABSTRACT

A clutch and brake control system for a tracklaying construction vehicle is disclosed, which comprises a turning operation system and a driving brake operation system. The turning operation system is operative to carry out slow turning steering and quick turning steering of the vehicle by controlling clutches provided for right and left crawler belts for the purpose of transmitting driving force to the crawler belts and controlling brakes provided for right and left crawler belts for the purpose of stopping the rotation of the crawler belts. The driving brake operation system is operative to stop the vehicle by actuating only both of the brakes. To simplify a control linkage extending from an operating section to valves thereby reducing looseness and deflection to improve operability, the brakes are each composed of (i) a steering brake valve for carrying out brake releasing or brake actuation by delivering or reducing fluid pressure with respect to a brake hydraulic circuit according to the operation of the turning operation system and (ii) a driving brake valve for carrying out brake actuation by reducing fluid pressure in the brake hydraulic circuit according to the operation of the driving brake operation system.

9 Claims, 5 Drawing Sheets

CLUTCH AND BRAKE CONTROL SYSTEM FOR TRACKLAYING CONSTRUCTION VEHICLE

TECHNICAL FIELD

The present invention relates to a clutch and brake control system for tracklaying construction vehicles, such as bulldozers.

BACKGROUND ART

FIG. 5 shows the structure of one known clutch and brake control system for bulldozers. The clutch and brake control system of this conventional structure is designed such that a steering lever 50, which also serves as a forward/reverse drive lever, is coupled to a steering control valve 53 integral with a brake valve through many rods 51, 52 and others, in order to operate right and left clutches and brakes. When slightly pushing the steering lever 50 down to the left (or to the right), the left (or right) steering clutch is brought into its half-disengaged state so that the vehicle gradually turns leftward (or rightward). When fully pushing the steering lever 50 down to the left (or to the right), the left (or right) steering clutch is brought into a completely disengaged state while the steering brake becomes actuated so that the vehicle turns quickly to the left (or to the right). A brake pedal 54 is coupled to the steering control valve 53 through rods 55, 56 and others. By depressing the brake pedal 54, only the right and left steering brakes are put in operation thereby stopping the vehicle.

The clutch and brake control system having the above conventional structure however reveals the following problem. Since the brake valve and the steering valve are integrally formed with the steering control valve 53, the system inevitably involves a complicated control linkage for coupling these integral valves to the steering lever and to the brake pedal, so that the looseness and deflection of the control linkage, and the like, hinder the vehicle from maintaining good operability.

The present invention is directed to overcoming the foregoing problem and therefore a prime object of the invention is to provide a clutch and brake control system for a tracklaying construction vehicle, the system enabling an improvement in the operability of the tracklaying construction vehicle by simplifying the control linkage extending from the operation section to the valves to reduce looseness and deflection.

DISCLOSURE OF THE INVENTION

The above object can be achieved by a clutch and brake control system for a tracklaying construction vehicle according to a first aspect of the invention. This control system comprises a turning operation system and a driving brake operation system, the turning operation system being operative to deliver a fluid pressure from an oil pressure source to either of clutches or to remove a fluid pressure therefrom, the clutches being provided for right and left crawler belts for the purpose of transmitting driving force to the crawler belts, so that engagement or disengagement of said either one of the clutches is carried out to slowly turn the vehicle, the turning operation system being also operative to reduce a fluid pressure delivered from the oil pressure source to either of brakes which are provided for right and left crawler belts for the purpose of stopping the rotation of the crawler belts, so that said either one of the brakes is actuated to quickly turn the vehicle, the driving brake operation system being operative to reduce a fluid pressure delivered from the oil pressure source to only both of the brakes so that both brakes are actuated to stop the vehicle, the clutch and brake control system comprising, in a brake hydraulic circuit extending from the oil pressure source to the brakes, (1) steering brake valves for delivering a fluid pressure into the brake hydraulic circuit to release the brakes or reducing a fluid pressure within the brake hydraulic circuit to actuate the brakes, in accordance with the operation of the turning operation system and (2) driving brake valves for reducing a fluid pressure within the brake hydraulic circuit to actuate the brakes in accordance with the operation of the driving brake operation system.

According to the invention, the brakes each comprise, in combination, the steering brake valve operated based on the operation of the turning operation system and the driving brake valve operated based on the operation of the driving brake operation system. Therefore, the degree of freedom for the arrangement of the steering brake valves and driving brake valves increases so that each control valve can be positioned in the vicinity of the operation lever, and the like. This allows considerable simplification of the control linkage extending from the operating section to each control valve and, in consequence, reduces looseness and deflection, thereby attaining improved operability.

A preferred arrangement of the invention is such that each of the steering brake valves is interlocked and paired with a steering clutch valve for controlling clutch disengagement and two sets of the steering brake valve and the steering clutch valve are laterally disposed, so that each of the steering clutch valves and its associated steering brake valve are subsequently operated by one steering operation lever. This simplifies the structure and therefore enables improved operability.

Preferably, the driving brake valves are operated by one foot pedal.

In the invention, it is preferable that the steering brake valves be positioned on the upstream side of the brake hydraulic circuit while the driving brake valves being on the downstream side of the brake hydraulic circuit. With this arrangement, when driving the vehicle in a braked condition by operating the driving brake valves with the foot pedal, pressure reducing control is performed by operating either of the steering brake valves so as to make the fluid pressure at the inlet side be less than or equal to a reduced relief control pressure by the associated driving brake valve thereby switching the fluid pressure downstream of the driving brake valve to a reduced control pressure by the associated upstream steering brake valve so that the drive braking force of the brake which has been steering-operated can be changed to vary the rotational speeds of the right and left crawler belts in order to adjust the direction of steering.

Preferably, the steering clutch valves are connected to the clutches respectively within a steering clutch hydraulic circuit and are variable pressure reducing valves which are operated by the steering operation lever to variably reduce the pressure of a fluid input to the steering clutch hydraulic circuit. Preferably, the steering brake valves are connected to the brakes respectively within the steering brake hydraulic circuit and are variable pressure reducing valves which are operated by the steering operation lever to reduce the pressure of a brake releasing pressure fluid input to the steering brake hydraulic circuit. Alternatively, the steering brake valves are connected to the brakes respectively within the steering brake hydraulic circuit and the driving brake valves are variable pressure reducing valves which are operated by the foot pedal to reduce the pressure of a brake releasing pressure fluid input to the steering brake hydraulic circuit downstream of the driving brake valves.

Preferably, in the invention, the steering brake hydraulic circuit has bypasses, each of which bypasses the upstream and downstream sides of its associated driving brake valve, and check valves which open its associated bypass when the inlet fluid pressures upstream of the driving brake valve become lower than the outlet fluid pressure downstream of the driving brake valve. With this arrangement, during the operation of the steering operation lever in combination with the foot pedal, each check valve opens when the inlet pressure of the driving brake valve, that is, the control pressure of the steering valve becomes lower than the outlet pressure of the driving brake valve, so that the control pressure of the steering clutch valve on the upstream side can be ensured, resulting in better operability.

According to a second aspect of the invention, there is provided a clutch and brake control system for a tracklaying construction vehicle, comprising a turning operation system and a driving brake operation system, the turning operation system being operative to deliver a fluid pressure from an oil pressure source to either of clutches or remove a fluid pressure therefrom, the clutches being provided for right and left crawler belts for the purpose of transmitting driving force to the crawler belts, so that engagement or disengagement of said either one of the clutches is carried out to slowly turn the vehicle, the turning operation system being also operative to reduce a fluid pressure delivered from the oil pressure source to either of brakes which are provided for right and left crawler belts for the purpose of stopping the rotation of the crawler belts, so that said either one of the brakes is actuated to quickly turn the vehicle, the driving brake operation system being operative to reduce a fluid pressure delivered from the oil pressure source to only both of the brakes so that both brakes are actuated to stop the vehicle, the clutch and brake control system comprising paired right and left steering valves provided for one steering operation lever, each steering valve being composed of a steering clutch valve of the variable fluid pressure reducing operation type for controlling fluid pressure for clutch disengagement and a steering brake valve of the variable fluid pressure reducing operation type for controlling fluid pressure for brake actuation, the right and left steering clutch valves being connected to the right and left clutches respectively in a steering clutch hydraulic circuit, the right and left steering brake valves being connected to the right and left brakes, respectively, in a steering brake hydraulic circuit, the clutch and brake control system comprising right and left driving brake valves of the variable fluid pressure reducing operation type which are positioned in series within a hydraulic circuit downstream of the right and left steering brake valves, and the right and left driving brake valves being simultaneously controlled by a foot pedal.

According to the invention, each steering valve operated by the steering operation lever and each driving brake valve operated by the foot pedal are respectively formed by an independent valve body. Therefore, the degree of freedom for the arrangement of the steering valves and driving brake valves increases so that each control valve can be positioned in the vicinity of the operation lever and the like. This allows considerable simplification of the control linkage extending from the operating section to each control valve and, in consequence, reduces looseness and deflection, thereby attaining improved operability. Further, in the invention, since the variable fluid pressure reducing operation type steering brake valves are provided on the upstream side of the steering brake hydraulic circuit and the variable fluid pressure reducing operation type driving brake valves are provided in series on the downstream side of the circuit, when driving the vehicle in a braked condition by operating the variable fluid pressure reducing operation type driving brake valves with the foot pedal, pressure reducing control is performed by operating either of the steering brake valves so as to make the fluid pressure at the inlet side be less than, or equal to, a reduced relief control pressure by the associated driving brake valve thereby switching the fluid pressure downstream of the driving brake valve to a reduced control pressure by the associated upstream steering brake, valve so that the drive braking force of the brake which has been steering-operated can be changed to vary the rotational speeds of the right and left crawler belts in order to adjust the direction of steering.

Preferably, in the invention, the steering valves are disposed under and in the vicinity of the steering operation lever close to the cab and the driving brake valves are disposed above the substantially mid-position of the right and left steering clutches and steering brakes. This enables considerable simplification of the control linkage extending from the steering operation lever to the steering valves and, in consequence, reduces looseness and deflection, thereby attaining more improved operability.

BEST MODE FOR CARRYING OUT THE INVENTION

Referring now to the accompanying drawings, a clutch and brake control system for a tracklaying construction vehicle will be described according to a preferred embodiment of the invention.

Figure 1:
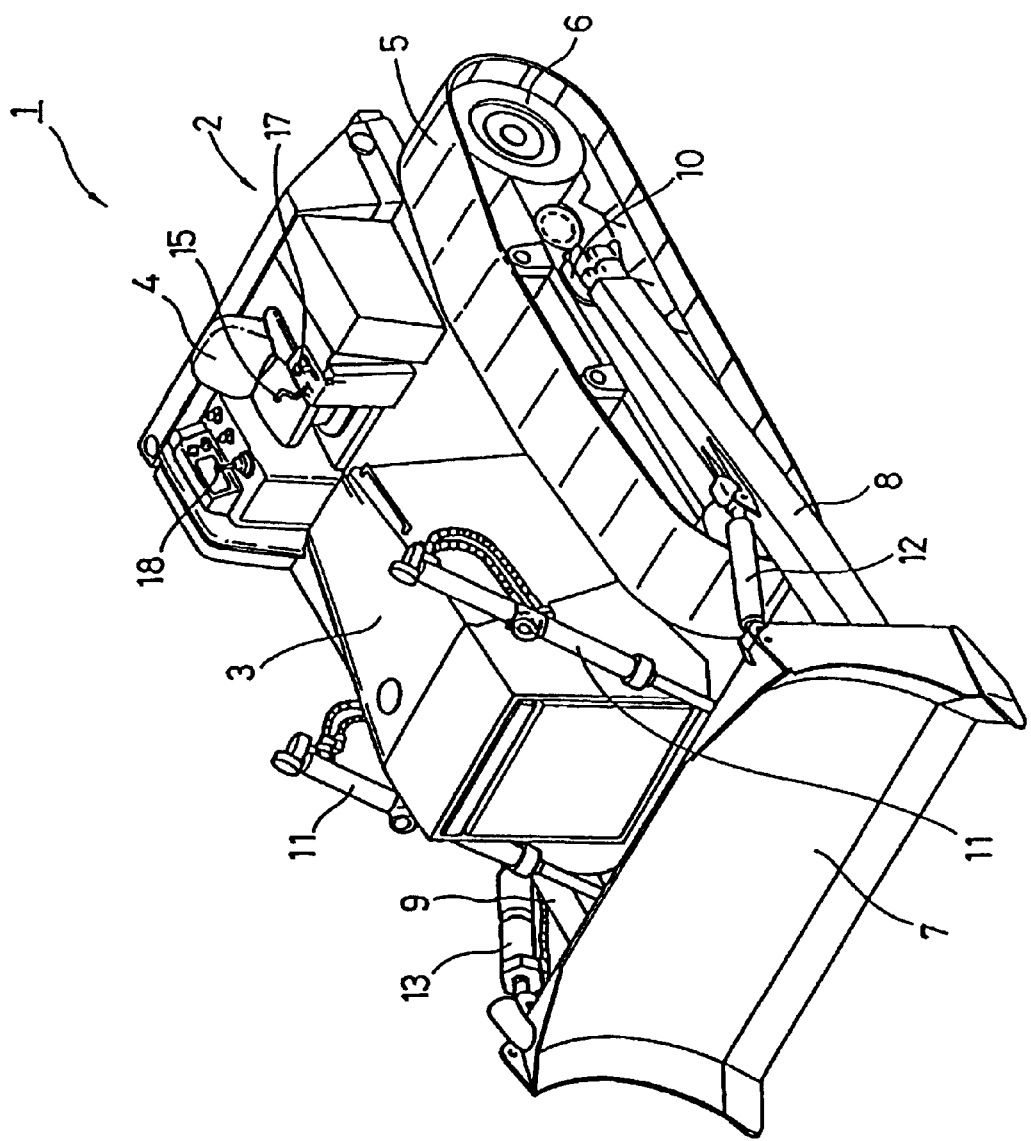
FIG. 1 shows the external appearance of a bulldozer according to an embodiment of the invention.

Described below is one embodiment in which the invention is applied to a bulldozer. FIG. 1 shows the external appearance of a bulldozer 1 associated with the embodiment of the invention.

In the bulldozer 1 of the present embodiment, there are provided a bonnet 3 and a cab 4 on a vehicle body 2. Disposed on both right and left sides of the vehicle body 2, when viewed in the forward driving direction of the vehicle body 2, are crawler belts 5 for driving the vehicle body 2 so as to travel forwardly and reversely and turn. The crawler belts 5 are respectively independently driven by driving force transmitted from an engine with the aid of their associated sprockets 6.

A blade 7 is supported at the leading ends of right and left straight frames 8, 9 the base ends of which are, in turn, pivotally supported at the right and left sides of the vehicle body 2 through trunnions 10 (the trunnion on the right side is not shown in the drawing) such that the blade 7 can be raised and lowered. A pair of side-by-side blade lift cylinders 11 are arranged between the blade 7 and the vehicle body 2, for raising and lowering the blade 7. A brace 12 and a blade tilt cylinder 13 are provided for laterally tilting the blade 7. Specifically, the brace 12 is positioned between the left straight frame 8 and the blade 7 while the blade tilt cylinder 13 being positioned between the right straight frame 9 and the blade 7.

Positioned on the left side of the cab 4 are a steering operation lever 15 which also serves as a gear change lever for forward and reverse drives and a fuel controlling lever 17, while a blade controlling lever 18, or the like, being disposed on the right side for raising, lowering, left-tilting and right-tilting the blade 7. Although not shown in the drawing, there is provided a decelerator pedal in front of the cab 4.

Figure 2:
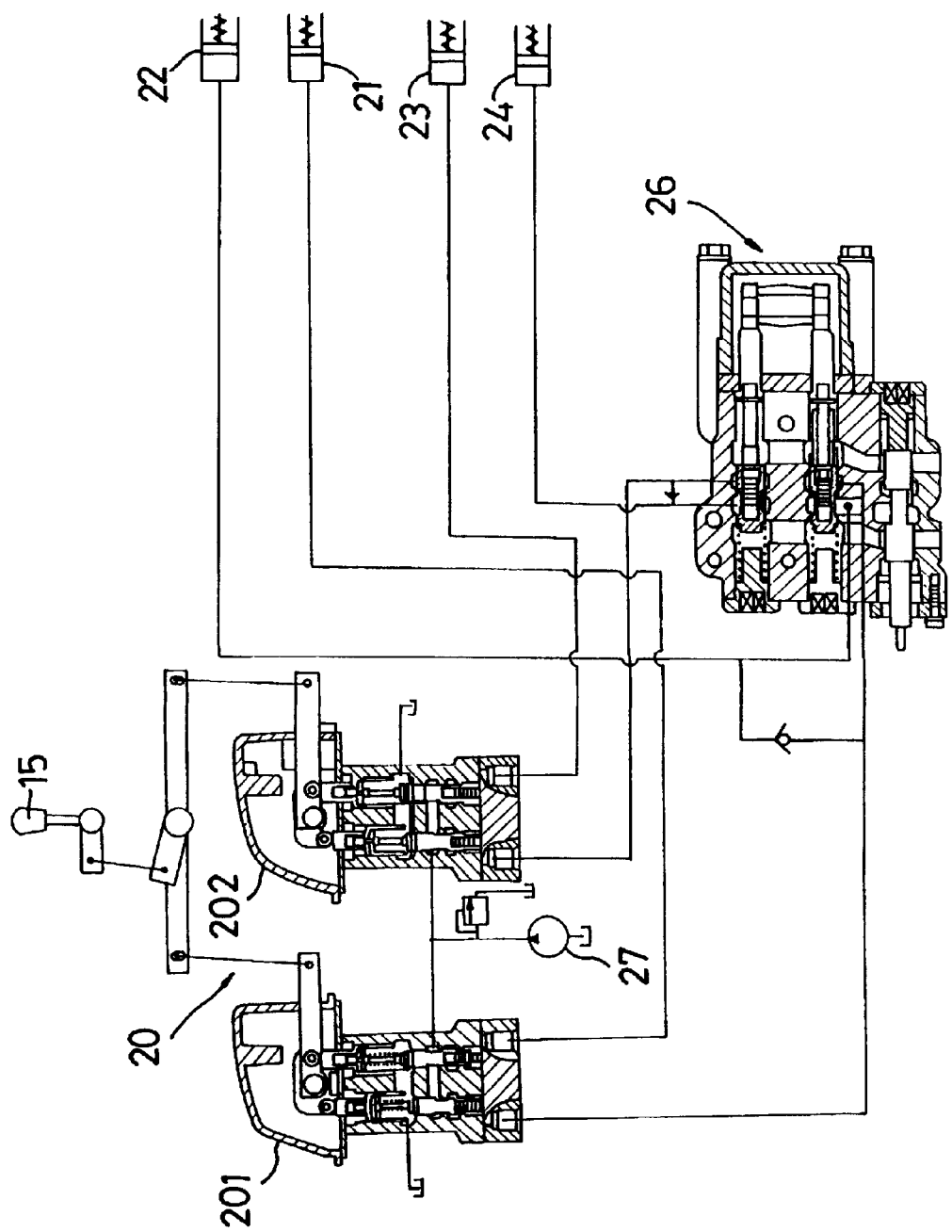
FIG. 2 diagrammatically shows a control system for steering valves and driving brake valves.

As seen from FIG. 2, disposed under and in the vicinity of the steering operation lever 15 are steering PPC valves (hereinafter referred to as "steering valves") operated by the steering operation lever 15. The steering valves 20 are a right steering valve 201 for controlling a right steering clutch 21 and a right steering brake 22 and a left steering valve 202 for controlling a left steering clutch 23 and a left steering brake 24. The right and left steering valves 201 and 202 are controlled by the single steering operation lever 15.

Figure 3:
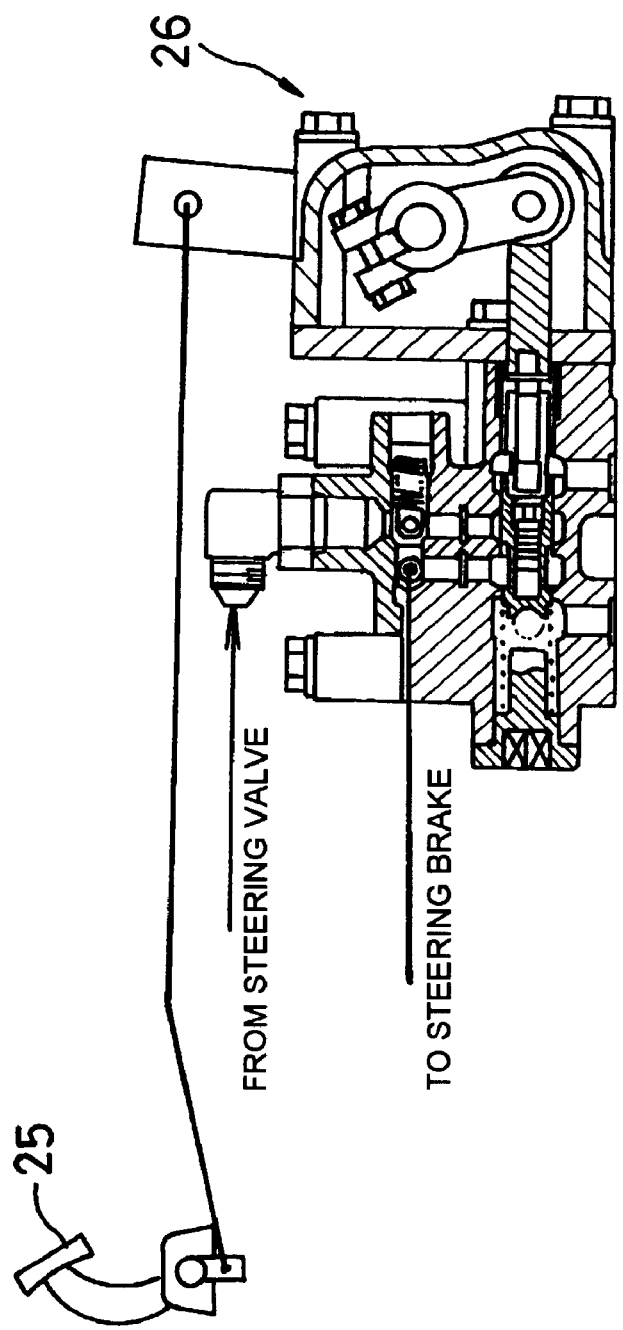
FIG. 3 diagrammatically shows a coupled condition of a brake pedal and a driving brake valve.

As seen from FIG. 3, a brake pedal (foot pedal) 25 provided at a position under, and in front of, the cab 4 is coupled to variable pressure reducing relief operation type driving brake valves 26 (i.e., a right driving brake valve 26*a* and a left driving brake valve 26*b*) through a rod. By depressing the brake pedal 25, only the right and left steering brakes 22, 24 are operated to stop the vehicle. It should be noted that the driving brake valves 26 are disposed above the substantial mid-position of the right and left steering clutches 21, 23/steering brakes 22, 24.

Figure 4:
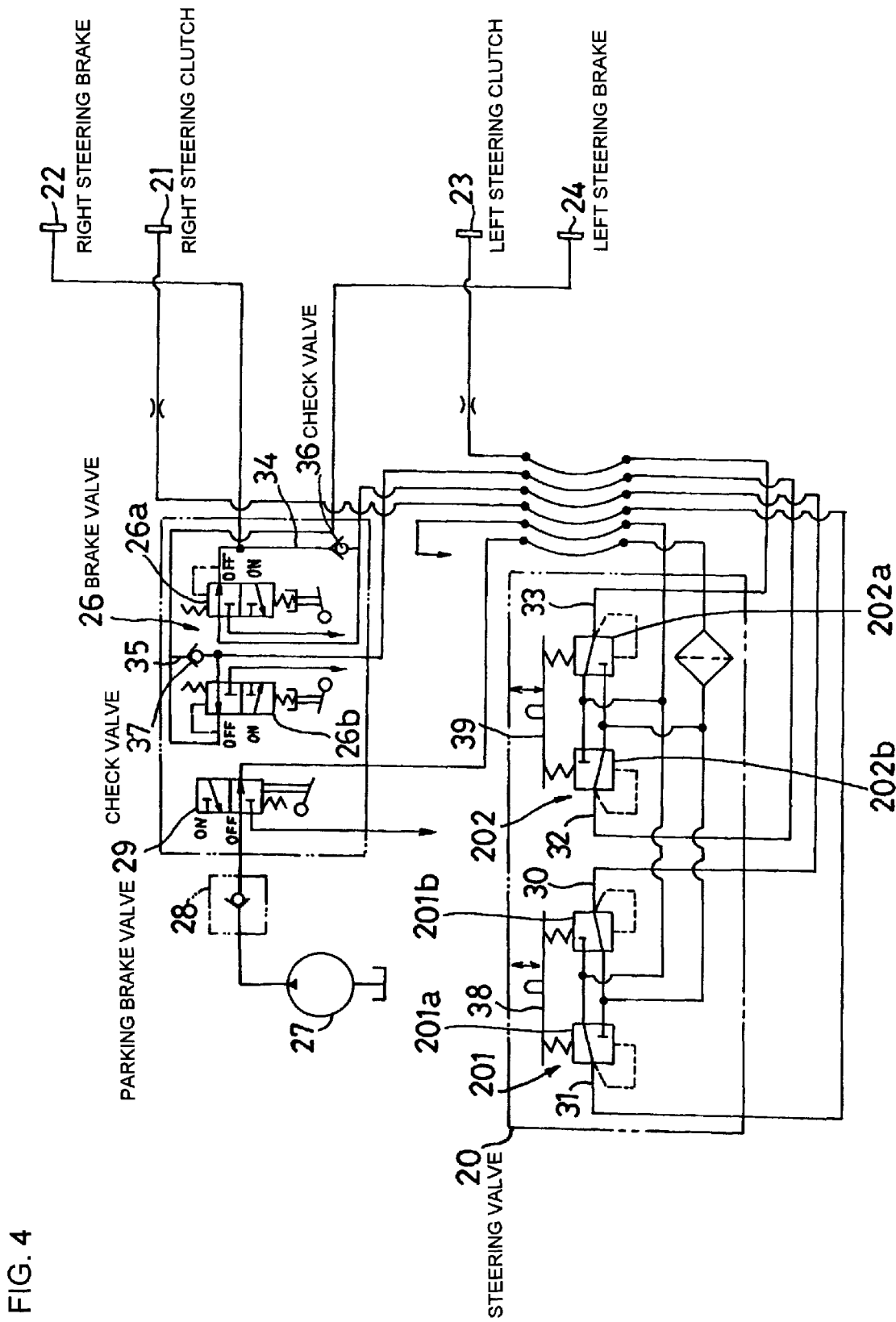
FIG. 4 is a hydraulic circuit diagram showing an example of control for steering clutches and steering brakes.
Figure 5:
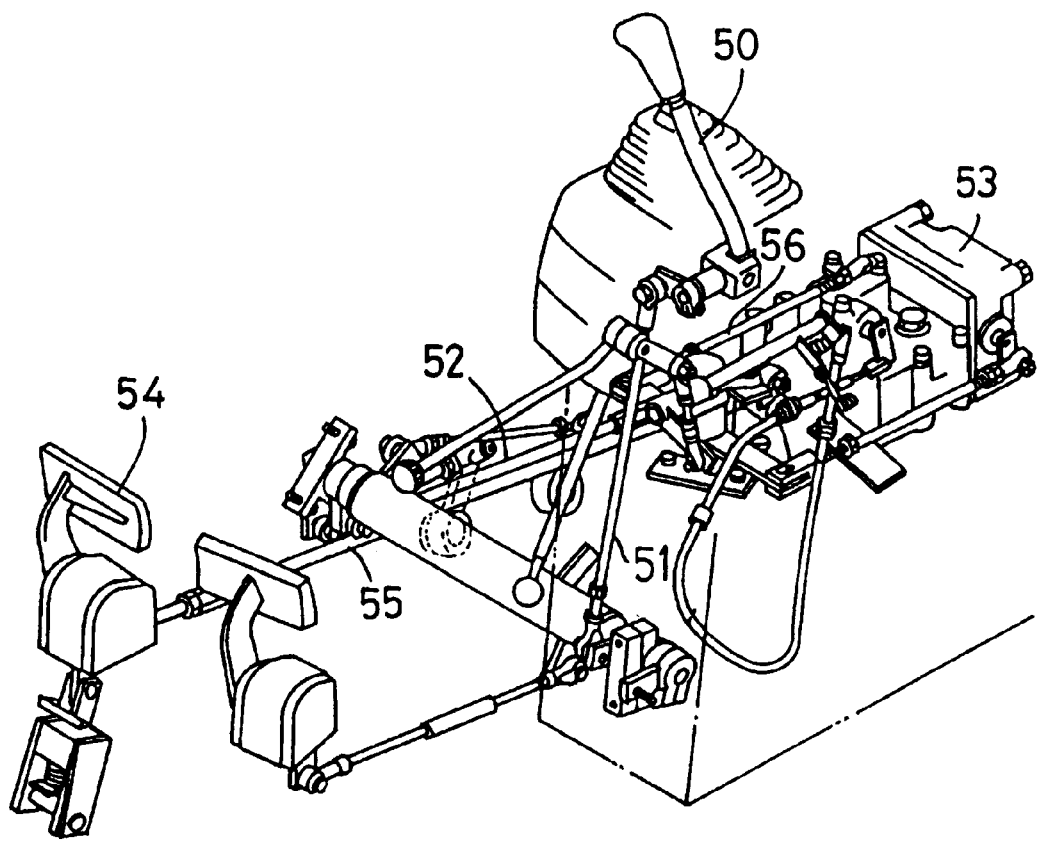
FIG. 5 is a perspective view of a conventional steering control system.

Next, reference is made to the hydraulic circuit diagram of FIG. 4 to describe an example of control for the steering clutches 21, 23 and the steering brakes 22, 24 according to this embodiment.

In such a hydraulic circuit, a pressure fluid from a hydraulic pump 27 is guided to the steering valve 20 through an inlet check valve 28 and a parking brake valve 29. The steering valves 20 are the right steering valve 201 and the left steering valve 202 as mentioned above, and these right and left steering valves 201, 202 are each composed of neutral-closing/variable fluid pressure reducing operation type steering clutch valves 201*a*, 202*a* and neutral-opening/variable fluid pressure reducing operation type steering brake valves 201*b*, 202*b*. The right and left neutral-closing type steering clutch valves 201*a*, 202*a* and the right and left neutral-opening type steering brake valves 201*b*, 202*b* are connected to the hydraulic pump 27 and to a parallel circuit. The right and left neutral-closing type steering clutch valves 201*a*, 202*a* are connected to the right and left steering clutches 21, 23 in right and left steering clutch hydraulic circuits 31, 33 respectively, whereas the right and left neutral-opening type steering brake valves 201*b*, 202*b* are connected to the right and left steering brakes 22, 24 in right and left steering brake hydraulic circuits 30, 32 respectively.

The right and left variable pressure reducing relief operation type driving brake valves 26*a*, 26*b* are connected in series to the right and left steering brake hydraulic circuits 30, 32, respectively.

In addition, there are provided bypasses 34, 35, each of which bypasses the upstream and downstream sides of the driving brake valve 26*a* (26*b*). These bypasses 34, 35 are provided with check valves 36, 37 respectively. Each check valve 36 (37) opens the bypass 34 (35) when the fluid pressure upstream of its associated driving brake valve 26*a* (26*b*) becomes lower than the fluid pressure downstream of the driving brake valve 26*a* (26*b*).

In the above structure, when the parking brake valve 29 is in operation, the hydraulic circuit from the hydraulic pump 27 is shut off so that the right and left steering clutches 21, 23 and the right and left steering brakes 22, 24 are supplied with no pressure fluid from the hydraulic pump 27 and kept in their respective engaged states by means of spring force.

When the engine is put in operation and the parking brake valve 29 is brought into its OFF state on condition that the right and left driving brake valves 26*a*, 26*b* are in their OFF states, the steering operation lever 15 for operating the steering valves 20 is in its neutral position, and the right and left neutral-closing type steering clutch valves 201*a*, 202*a* and the right and left neutral-opening type steering brake valves 201*b*, 202*b* are in their respective conditions shown in FIG. 4, the pressure fluid from the hydraulic pump 27 passes through the parking brake valve 29 and the right and left neutral-opening type steering brake valves 201*b*, 202*b* and then flows into the right and left steering brake hydraulic circuits 30, 32 so that the right and left steering brakes 22, 24 are so operated as to be released. On the other hand, since the right and left neutral-closing type steering clutch valves 201*a*, 202*a* are closed, the pressure fluid from the hydraulic pump 27 does not flow into the right and left steering clutch hydraulic circuits 31, 33, so that the right and left steering clutches 21, 23 are in their engaged states by a spring force. Thus, the bulldozer is in its straight-ahead driving state.

If the steering operation lever 15 is slightly pushed down to the right, a stroke is added in which an operation bar 38 moves the right neutral-closing type steering clutch valve 201*a* to its open position. Then, an operation control reduced pressure fluid is introduced into the right steering clutch hydraulic circuit 31 to apply a fluid pressure to the right steering clutch 21 thereby moving the right steering clutch 21 toward its disengaged position against a clutch engagement spring force. Thus, the right steering clutch 21 is brought into its half-engaged state and a rotation power to be transmitted to the right crawler belt is controlled and limited. In consequence, the bulldozer slowly turns to the right.

If the steering operation lever 15 is fully pushed down to the right, a stroke is added, in which the operation bar 38 increases the output pressure of the right neutral-closing type steering clutch valve 201*a* to bring the right steering clutch 21 into its fully disengaged state and the operation bar 38 moves the right neutral-opening type steering brake valve 201*b* to its closed position. Then, a brake releasing fluid pressure within the right steering brake hydraulic circuit 30 is controlled so as to decrease thereby reducing the fluid pressure on the right steering brake 22 so that the right steering brake 22 is brought into its engaged state by a spring force to stop the rotation of the right crawler belt. In consequence, the bulldozer quickly turns to the right.

Similarly, if the steering operation lever 15 is slightly pushed down to the left, a stroke is added in which the operation bar 39 moves the left neutral-closing type steering clutch valve 202a to its open position. Then, an operation control reduced pressure fluid is introduced into the left steering clutch hydraulic circuit 33 to apply a fluid pressure to the left steering clutch 23 thereby moving the left steering clutch 23 toward its disengaged position against a clutch engagement spring force. Thus, the left steering clutch 23 is brought into its half-engaged state and a rotation power to be transmitted to the left crawler belt is controlled and limited. In consequence, the bulldozer slowly turns to the left.

If the steering operation lever 15 is fully pushed down to the left, a following stroke is added, in which the operation bar 39 increases the output pressure of the left neutral-closing type steering clutch valve 202a to bring the left steering clutch 23 into its fully disengaged state and the operation bar 39 moves the left neutral-opening type steering brake valve 202b to its closed position. Then, a brake releasing fluid pressure within the left steering brake hydraulic circuit 32 is controlled so as to decrease thereby reducing the fluid pressure on the left steering brake 24 so that the left steering brake 24 is brought into its engaged state by a spring force to stop the rotation of the left crawler belt. In consequence, the bulldozer quickly turns to the left.

If the right and left variable pressure reducing relief operation type driving brake valves 26a, 26b are forcibly moved to, and kept at, their respective ON positions by depressing the brake pedal 25, the fluid pressures at the inlet sides of the driving brake valves 26a, 26b are shut off while the pressure fluids downstream of the driving brake valves 26a, 26b are drained. As a result, only the right and left steering brakes 22, 24 are brought into their actuated states so that the vehicle is stopped.

When mounting a bulldozer on a trailer, it is sometimes necessary to steer the bulldozer so as to turn while keeping the bulldozer in a slow driven condition by depressing the brake pedal 25. In this case, the steering operation lever 15 is pushed down to its turning steering position to disengage the steering clutch 21 or 23 positioned on the side corresponding to the turning steering direction by means of the neutral-closing type steering clutch valve 201a or 202a. At the same time, the fluid pressure input to the variable pressure reducing relief operation type driving brake valve 26a or 26b is controlled by the neutral-opening type steering brake valve 201b or 202b to become less than, or equal to, a set relief pressure for brake actuation by the driving brake valve 26a or 26b. This allows the driving brake valve 26a or 26b to be kept in its OFF position thereby equalizing the fluid pressure for brake actuation on the downstream side to the input pressure on the upstream side to increase a steering brake actuating force. As a result, the crawler belt positioned on the side corresponding to the turning steering direction is stopped to enable a turn in the desired steering direction.

There is the problem in the above operation that when making the pressure input to the variable pressure reducing relief operation type driving brake valve 26a or 26b be less than, or equal to, a relief pressure by performing pressure reducing control with the variable fluid pressure reducing operation type steering brake valve 201b or 202b, the relief spring and pilot pressure conflict with each other which delays the opening operation for moving the driving brake valve 26a or 26b to its OFF position. This conflict can be eliminated by making the fluid pressure on the downstream side be equal to the input pressure on the upstream side by opening the check valves 36, 37 inserted in the bypasses 34, 35, so that improved switching response can be achieved and stable operation control pressure for the steering clutch valves 201a, 202a can be ensured.

According to the present embodiment, the steering valve 20 positioned on the upstream side of the hydraulic circuit is composed of the right and left neutral-closing/variable fluid pressure reducing operation type steering clutch valves 201a, 202a and the right and left neutral-opening/variable fluid pressure reducing operation type steering brake valves 201b, 202b, these steering clutch and brake valves being paired off and positioned in the vicinity of the steering operation lever. By pushing the steering operation lever down in a turning steering direction, a steering clutch valve is moved to the open side and subsequently, its associated steering brake valve is moved to the closing side, so that a reduced pressure fluid for clutch disengagement and a reduced pressure fluid for brake actuation are connected to the clutch and brake system through a fluid line. With this arrangement, a mechanical linkage for operation control is not required at any other places than between the steering operation lever and the steering clutch valves and the steering brake valves, so that the linkage can be simplified and looseness and deflection can be reduced, thereby attaining improved operability.

Further, neutral-opening type variable fluid pressure reducing valves are employed as the steering brake valves and a brake releasing fluid is supplied when each steering brake valve is in its neutral state. Variable pressure reducing relief operation type driving brake valves are disposed downstream of the respective steering brake valves. Since brake control is performed by inputting a brake releasing fluid, the pressure of which has been reduced by either of the upstream steering brake valves and brake control is performed by reducing and releasing the pressure of a brake releasing fluid with either of the downstream driving brake valves, the steering brake valves and the driving brake valves can be separately arranged on a fluid line and separately operated by different mechanical linkages. This contributes to simplification of the brake valve system and its operation and, in consequence, brings about improved operability.

Even when operating the steering operation lever 15 and the brake pedal 25 in combination, the variable pressure reducing relief operation type driving brake valves 26a, 26b operated by the brake pedal 25 control the reduction of a brake releasing fluid pressure downstream of the valves, without affecting a fluid pressure on the upstream side. With this arrangement, a pressure source for the steering clutches 21, 23 and safety can be ensured so that smooth turning can be carried out.

In addition, the control system of the invention is provided with the bypasses 34, 35 each of which bypasses the upstream and downstream sides of its associated variable pressure reducing relief operation type driving brake valve 26a (26b) and with the check valves 36, 37 each of which opens its associated bypass 34 (35) when the pressure at the inlet side of the variable pressure reducing relief operation type driving brake valve 26a (26b) becomes lower than the pressure at the outlet side thereof. With this arrangement, when operating the steering operation lever 15 and the brake pedal 25 in combination, the operation control by the variable fluid pressure reducing operation type steering clutch valves 201a or 202a has precedence so that a decrease in operability can be avoided.

While the foregoing embodiment has been described with a case in which the invention is applied to a bulldozer, it is apparent that the invention is not limited to this but applicable to other types of tracklaying vehicles.

What is claimed is:

1. A clutch and brake control system for a tracklaying construction vehicle, comprising a turning operation system and a driving brake operation system, the turning operation system being operative to deliver a fluid pressure from an oil pressure source to either of clutches or remove a fluid pressure therefrom, the clutches being provided for right and left crawler belts for the purpose of transmitting driving force to the crawler belts, so that engagement or disengagement of said either one of the clutches is carried out to slowly turn the vehicle, the turning operation system being also operative to reduce a fluid pressure delivered from the oil pressure source to either of brakes which are provided for right and left crawler belts for the purpose of stopping the rotation of the crawler belts, so that said either one of the brakes is actuated to quickly turn the vehicle, the driving brake operation system being operative to reduce a fluid pressure delivered from the oil pressure source to only both of the brakes so that both brakes are actuated to stop the vehicle, the clutch and brake control system comprising, in a brake hydraulic circuit extending from the oil pressure source to the brakes, steering brake valves for delivering a fluid pressure into the brake hydraulic circuit to release the brakes or reducing a fluid pressure within the brake hydraulic circuit to actuate the brakes, in accordance with the operation of the turning operation system and driving brake valves for reducing a fluid pressure within the brake hydraulic circuit to actuate the brakes in accordance with the operation of the driving brake operation system, and wherein said steering brake valves are positioned on the upstream side of the brake hydraulic circuit while said driving brake valves are positioned on the downstream side of the brake hydraulic circuit.

2. A clutch and brake control system for a tracklaying construction vehicle according to claim 1, wherein each of said steering brake valves is interlocked and paired with a steering clutch valve for controlling clutch disengagement and two sets of said steering brake valve and said steering clutch valve are laterally disposed, so that each of the steering clutch valves and its associated steering brake valve are subsequently operated by one steering operation lever.

3. A clutch and brake control system for a tracklaying construction vehicle according to claim 1, wherein said driving brake valves are operated by one foot pedal.

4. A clutch and brake control system for a tracklaying construction vehicle according to claim 2, wherein said steering clutch valves are connected to said clutches respectively within a steering clutch hydraulic circuit and are variable pressure reducing valves which are operated by the steering operation lever to variably reduce the pressure of a fluid input to said steering clutch hydraulic circuit.

5. A clutch and brake control system for a tracklaying construction vehicle according to claim 2, wherein said steering brake valves are connected to said brakes respectively within a steering brake hydraulic circuit and are variable pressure reducing valves which are operated by said steering operation lever to reduce the pressure of a brake releasing pressure fluid input to said steering brake hydraulic circuit.

6. A clutch and brake control system for a tracklaying construction vehicle according to claim 2, wherein said steering brake valves are connected to said brakes respectively within a steering brake hydraulic circuit and said driving brake valves are variable pressure reducing valves which are operated by a foot pedal to reduce the pressure of a brake releasing pressure fluid input to said steering brake hydraulic circuit downstream of said driving brake valves.

7. A clutch and brake control system for a tracklaying construction vehicle according to claim 6, wherein said steering brake hydraulic circuit has bypasses each of which bypasses the upstream and downstream sides of its associated driving brake valve and check valves each of which opens its associated bypass when the inlet fluid pressure upstream of the driving brake valve becomes lower than the outlet fluid pressure downstream of the driving brake valve.

8. A clutch and brake control system for a tracklaying construction vehicle, comprising a turning operation system and a driving brake operation system, the turning operation system being operative to deliver a fluid pressure from an oil pressure source to either of clutches or remove a fluid pressure therefrom, the clutches being provided for right and left crawler belts for the purpose of transmitting driving force to the crawler belts, so that engagement or disengagement of said either one of the clutches is carried out to slowly turn the vehicle, the turning operation system being also operative to reduce a fluid pressure delivered from the oil pressure source to either of brakes which are provided for right and left crawler belts for the purpose of stopping the rotation of the crawler belts, so that said either one of the brakes is actuated to quickly turn the vehicle, the driving brake operation system being operative to reduce a fluid pressure delivered from the oil pressure source to only both of the brakes so that both brakes are actuated to stop the vehicle, the clutch and brake control system comprising paired right and left steering valves provided for one steering operation lever, each steering valve being composed of a steering clutch valve of the variable fluid pressure reducing operation type for controlling fluid pressure for clutch disengagement and a steering brake valve of the variable fluid pressure reducing operation type for controlling fluid pressure for brake actuation, the right and left steering clutch valves being connected to the right and left clutches respectively within a steering clutch hydraulic circuit, the right and left steering brake valves being connected to the right and left brakes respectively within a steering brake hydraulic circuit, the clutch and brake control system comprising right and left driving brake valves of the variable fluid pressure reducing operation type which are positioned in series within a hydraulic circuit downstream of the right and left steering brake valves, and the right and left driving brake valves being simultaneously controlled by a foot pedal.

9. A clutch and brake control system for a tracklaying construction vehicle according to claim 8, wherein said steering valves are disposed under and in the vicinity of the steering operation lever close to a cab and the driving brake valves are disposed above the substantially mid position of the right and left steering clutches and steering brakes.

* * * * *